(12) United States Patent
Penton

(10) Patent No.: US 8,863,516 B2
(45) Date of Patent: Oct. 21, 2014

(54) SYSTEM FOR COLLECTING CONCENTRATED SOLAR RADIATION

(75) Inventor: John D. Penton, Pasadena, TX (US)

(73) Assignee: Chevron U.S.A. Inc., San Ramon, CA (US)

( * ) Notice: Subject to any disclaimer, the term of this patent is extended or adjusted under 35 U.S.C. 154(b) by 307 days.

(21) Appl. No.: 13/216,022

(22) Filed: Aug. 23, 2011

(65) Prior Publication Data

US 2013/0047610 A1    Feb. 28, 2013

(51) Int. Cl.
| | |
|---|---|
| F03G 6/00 | (2006.01) |
| F03G 7/00 | (2006.01) |
| F22B 1/02 | (2006.01) |
| F24J 2/07 | (2006.01) |
| F24J 2/24 | (2006.01) |
| F03G 6/06 | (2006.01) |
| F01K 25/08 | (2006.01) |
| F22B 1/00 | (2006.01) |
| F24J 2/10 | (2006.01) |

(52) U.S. Cl.
CPC .... *F24J 2/07* (2013.01); *F24J 2/24* (2013.01); *F03G 6/065* (2013.01); *F01K 25/08* (2013.01); *F22B 1/006* (2013.01); *F24J 2/245* (2013.01); *F24J 2/10* (2013.01); *Y02B 10/20* (2013.01); *Y02E 10/46* (2013.01); *F24J 2002/109* (2013.01); *Y02E 10/44* (2013.01); *Y02E 10/41* (2013.01)
USPC .......... 60/641.15; 60/641.11; 122/34

(58) Field of Classification Search
USPC .............. 60/641.8–641.15; 122/34, 488, 492, 122/504, 505; 126/634–677
See application file for complete search history.

(56) References Cited

U.S. PATENT DOCUMENTS

| | | | | |
|---|---|---|---|---|
| 3,097,630 | A * | 7/1963 | Kinyon et al. | 122/34 |
| 3,360,905 | A * | 1/1968 | Aarnio | 96/319 |
| 3,998,206 | A * | 12/1976 | Jahn | 126/578 |
| 4,245,618 | A * | 1/1981 | Wiener | 126/643 |
| 4,485,803 | A * | 12/1984 | Wiener | 126/591 |
| 5,979,372 | A * | 11/1999 | Park | 122/504.2 |
| 6,360,542 | B1 * | 3/2002 | Luo | 60/641.15 |
| 6,931,851 | B2 * | 8/2005 | Litwin | 60/641.11 |
| 7,735,323 | B2 * | 6/2010 | Bennett | 60/641.8 |
| 2004/0112374 | A1 | 6/2004 | Litwin | |
| 2010/0101564 | A1 | 4/2010 | Iannacchione et al. | |
| 2010/0258112 | A1 | 10/2010 | Viskup et al. | |
| 2012/0199117 | A1 * | 8/2012 | Ricci et al. | 126/704 |

FOREIGN PATENT DOCUMENTS

| | | |
|---|---|---|
| EP | 2000669 A2 | 12/2008 |
| GB | 2060860 | 5/1981 |
| WO | 2008118980 A1 | 10/2008 |

OTHER PUBLICATIONS

PCT/US2012/052071 filed Aug. 23, 2012, International Search Report dated Dec. 20, 2013, 3 pages.

* cited by examiner

*Primary Examiner* — Christopher Jetton

(57) ABSTRACT

The present invention is directed to a solar energy system including a tower having a solar radiation receiver, the solar radiation receiver including a plurality of tubes carrying a heat-transfer medium and a drum, the drum in thermal communication with the tubes, and one or more mirrors configured to reflect solar radiation onto the receiver, wherein the receiver receives the reflected solar radiation from the mirrors, thereby heating the heat transfer medium and vaporizing the heat transfer medium.

18 Claims, 7 Drawing Sheets

SYSTEM FOR COLLECTING CONCENTRATED SOLAR RADIATION

FIELD OF THE INVENTION

The present invention generally relates to systems for collecting heat flux in the form of concentrated solar radiation. More particularly, the present invention relates to a power tower system for collecting concentrated solar radiation and having a curved receiver, where the components of the receiver are self-contained.

BACKGROUND AND SUMMARY OF THE INVENTION

Concentrating solar power (CSP) offers a clean, endless, and reliable source of energy with potentially unlimited capacity. CSP plants have many advantages over other types of power plants, one of the most notable being that CSP plants produce little to no carbon dioxide emissions. As a result, many countries, including the United States, have begun integrating CSP into their national supply grids through large-scale commercial plants.

CSP plants produce power by concentrating sunlight to heat water and produce steam. The steam then rotates a turbine connected to a generator, or other conventional device, thereby producing electricity. Currently, there are four types of CSP technologies, including: parabolic troughs, dish/engine systems, linear Fresnel reflectors, and power towers. Parabolic trough technology uses parabolic mirrors to concentrate sunlight onto a linear receiver pipe positioned along the mirrors' focal line. Because this technology was the first CSP technology, it is the most developed and commonly used technology. Dish/engine systems use a parabolic mirror to focus sunlight on a receiver placed at the mirror's focal point. These systems are smaller and may be used to generate power for smaller applications, such as for a single building. Linear Fresnel reflector technology is similar to parabolic trough technology, except that it uses flat mirrors that reflect sunlight onto water-filled pipes that generate steam. This technology often has a cost advantage over parabolic trough technology because flat mirrors are usually less expensive to produce than parabolic mirrors. Finally, power tower systems typically use flat mirrors to reflect the sun's rays onto a receiver located at the top of a central tower, often three to five hundred feet tall.

A problem with existing CSP technology is the complex array of components that must be assembled for the system to operate. Typically, the assembly of the system must be accomplished in the field. In the case of power tower technology, existing systems consist of a receiver mounted on top of a structural steel tower having box sections, diagonal bracing, etc. Many of the towers have as many as three to four thousand pieces of steel that must be assembled in the field. In addition, the rest of the system generally requires a single tube or pipe, or an assembly of pipes in the form of a piped manifold. The pipes are interconnected with receiver panels and a drum. These must be field erected using a significant number of piping components to be installed atop the large structural steel tower. Such a project often requires thousands of hours of labor or more and is very expensive.

In view of the problems noted above, there is a need for improved CSP systems that may require less in-field assembly and that may also efficiently collect solar radiation. The present invention addresses these needs and more.

The present invention provides a solar energy system that includes a tower having a solar radiation receiver, the solar radiation receiver including a plurality of tubes carrying a heat-transfer medium and a drum, where the drum is in thermal communication with the tubes. The solar energy apparatus further includes one or more mirrors configured to reflect solar radiation onto the receiver. The receiver receives the reflected solar radiation from the mirrors, thereby heating the heat transfer medium and vaporizes the heat transfer medium.

The present invention further provides a method of generating power from sunlight using the above described system, the method including focusing sunlight on a convex solar radiation receiver attached to a tower, the receiver being in thermal communication with a heat transfer medium such that focused sunlight heats and vaporizes the heat transfer medium, and employing the vaporized heat transfer medium in a turbine generator to produce power.

The present invention also provides a solar energy system that includes a tower having a substantially convex solar radiation receiver attached thereto, and a plurality of mirrors arranged circumferentially around the tower and configured to focus sunlight onto the receiver, wherein the receiver includes a plurality of tubes carrying a heat transfer medium, the tubes configured to accept radiation from the sunlight reflected on the receiver and heat the heat transfer medium and vaporize the heat transfer medium within the receiver.

BRIEF DESCRIPTION OF THE DRAWINGS

A more complete appreciation of the subject matter of the present invention and the various advantages thereof can be realized by reference to the following detailed description in which reference is made to the accompanying drawings in which.

DETAILED DESCRIPTION OF THE INVENTION

Figure 1:
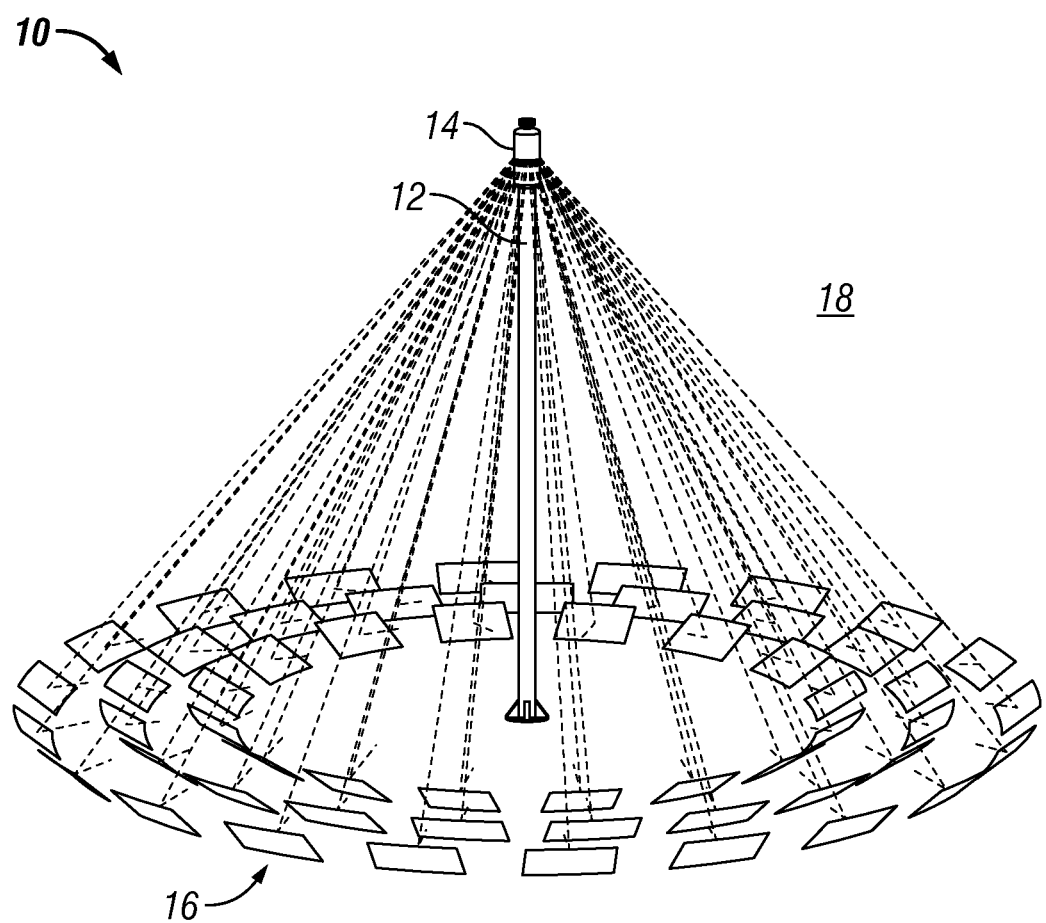
FIG. 1 is a schematic perspective view of a system for collecting concentrated solar radiation.

The foregoing aspects, features, and advantages of the present invention will be further appreciated when considered with reference to the following description of preferred embodiments and accompanying drawings, wherein like reference numerals represent like elements. In describing embodiments of the invention illustrated in the appended drawings, specific terminology will be used for the sake of clarity. However, the invention is not intended to be limited to the specific terms used, and it is to be understood that each specific term may include equivalents that operate in a similar manner to accomplish a similar purpose.

Referring now to the drawings, FIG. 1 shows a schematic perspective view of a system 10 for collecting heat flux in the form of solar radiation according to one possible embodiment of the present invention. The system 10 includes a tower 12 that has a receiver 14. The receiver is preferably, but not necessarily, positioned at or near the top of the tower 12. The system further includes a plurality of mirrors 16 that may preferably be positioned circumferentially around the tower 12. The mirrors 16 may surround the tower 12 on all sides, as shown in FIG. 1. Alternatively, the mirrors 16 may surround only a portion of the tower 12.

In practice, the mirrors 16 are oriented so that they receive sunlight 18 and reflect the sunlight to a focal point located at the receiver 14. As discussed below, the receiver 14 is configured to absorb radiant heat associated with the focused sunlight and to use at least a portion of that heat to generate vapor. The vapor, in turn, may be used in any convenient process, such as to produce electricity or power. Because the mirrors 16 are positioned circumferentially around the tower 12, the sunlight 18 may advantageously be focused onto the receiver 14 from many different directions. Thus, in order to maximize the amount of radiant heat absorbed, the receiver 14 is often configured to receive sunlight from many different directions. In one preferred embodiment, the receiver 14 has a convex shape allowing it to surround at least a portion of the tower 12 and receive focused sunlight from more than one direction. In another preferred embodiment, the receiver is cylindrical and receives focused sunlight from every direction 360 degrees around the tower.

Figure 2:
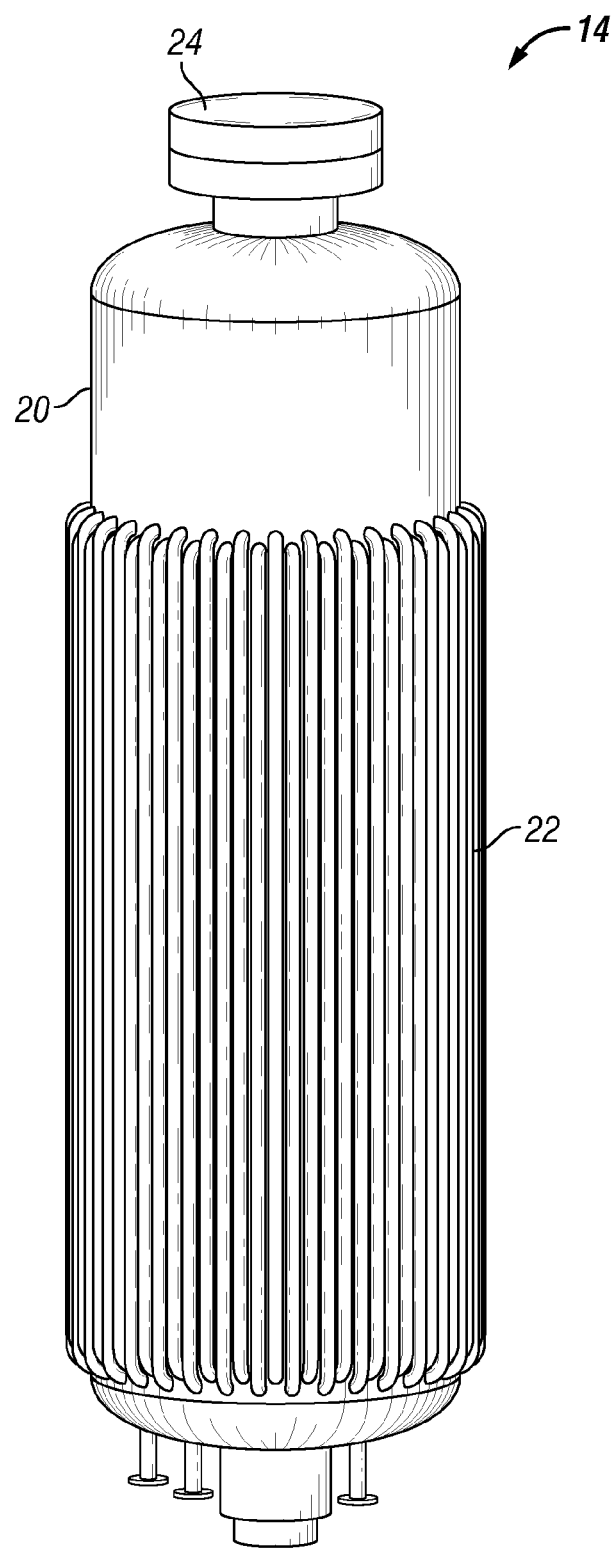
FIG. 2 is a side view of a receiver for receiving focused sunlight.

Referring now to FIG. 2, there is shown a side view of a receiver 14 according to an embodiment of the present invention. The receiver 14 may preferably have a drum 20 and a plurality of external tubes 22 that carry a heat transfer medium. The heat transfer medium may be any fluid that has the critical pressure, critical temperature, thermal stability, and resistance to degradation or dissociation required to properly vaporize within the receiver. For example, the heat transfer medium may be water, methanol, single component hydrocarbon, single component refrigerant, etc. Preferred temperatures and pressures for the heat transfer medium vary depending on the fluid. For example, for water the preferred pressures may be between about 250 psia and about 2500 psia, and the temperature between about 400° F. and about 670° F. In the case of methanol, the preferred pressures may be between about 600 psia and about 1050 psia, and the temperature between about 400° F. and about 460° F. For hydrocarbons, the preferred pressure may be between about 150 psia and about 1100 psia, and the temperature between about 400° F. and about 1100° F.

As the receive 14 receives the focused sunlight 18, the radiant heat of the sunlight heats the heat transfer medium in the external tubes 22. The heat transfer medium then at least partially vaporizes within the tubes. This vaporization reduces the density of the heat transfer medium, and the heat transfer medium then circulates through the tubes 22 by natural convection. The vapor/water mixture is then returned to the drum 20 where it is transferred out of the receiver 14.

Figure 3:
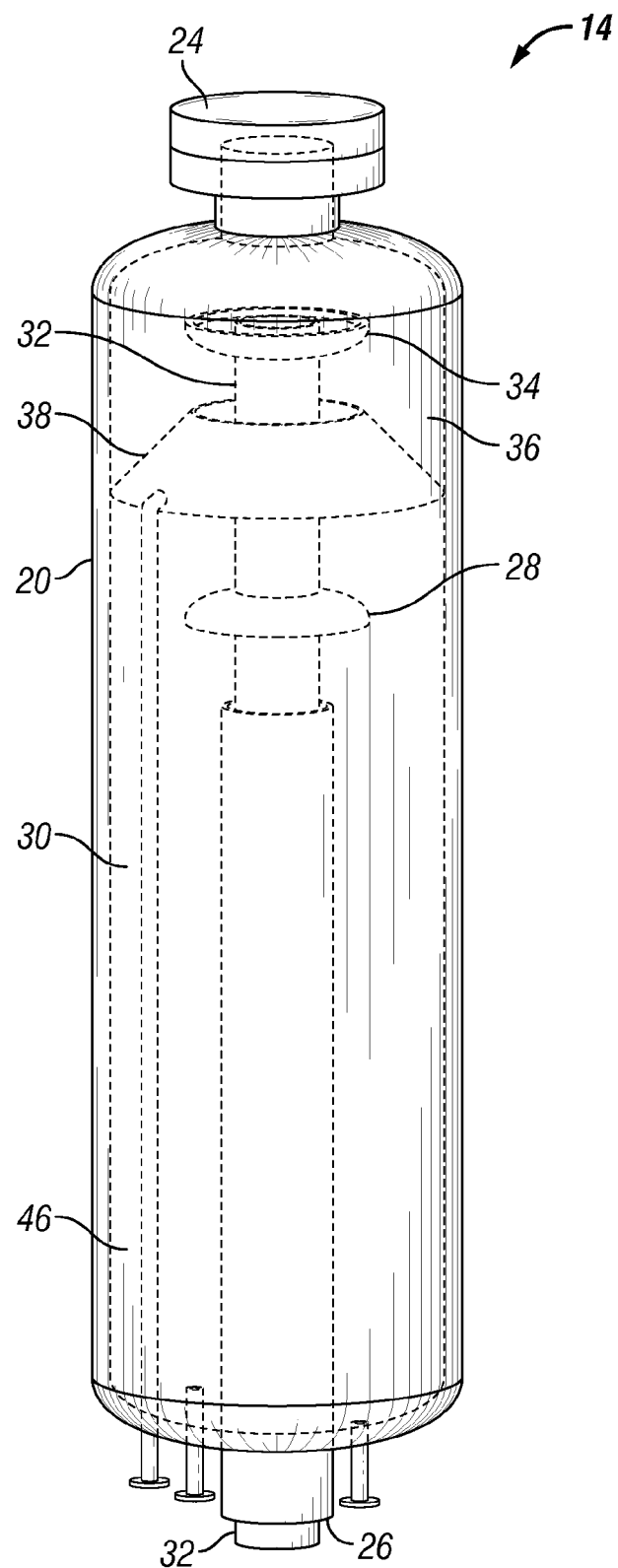
FIG. 3 is a transparent side view of the receiver of FIG. 2 where the internal components are made visible.
Figure 4:
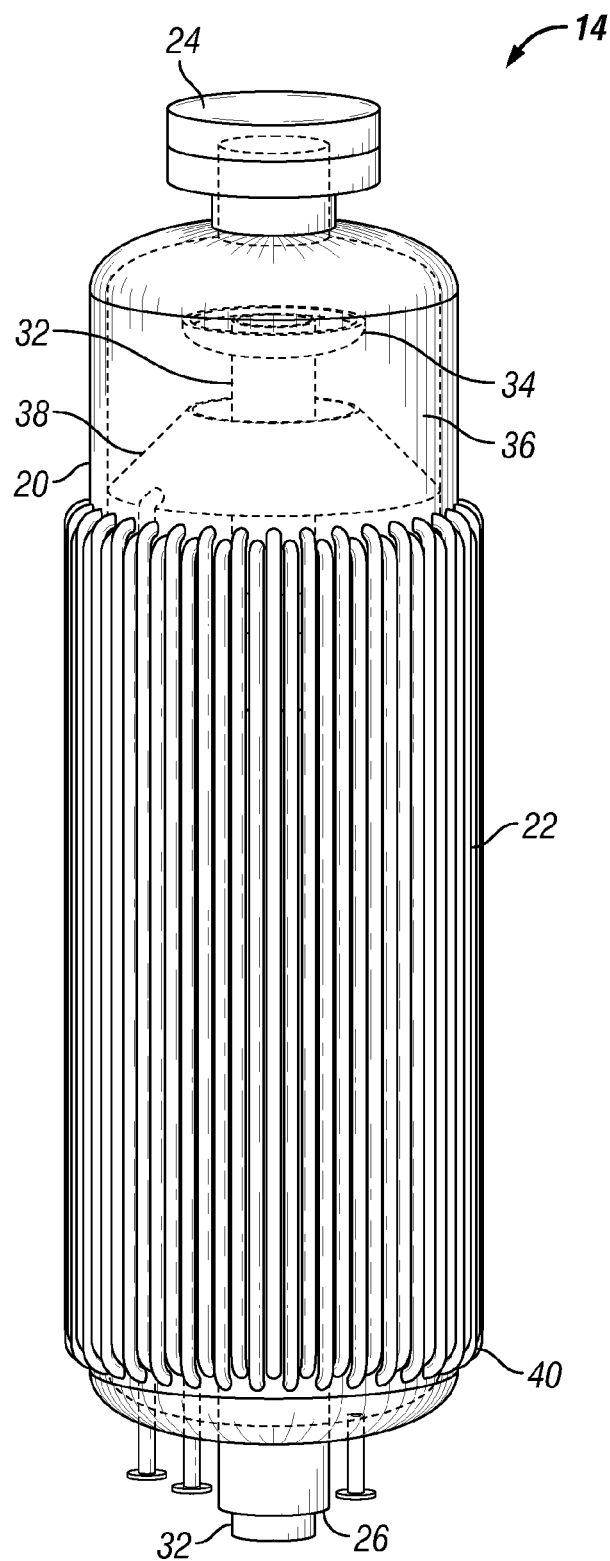
FIG. 4 is a transparent side view of the receiver of FIGS. 2 and 3 where the internal components are made visible and showing the external tubes of the receiver.
Figure 5:
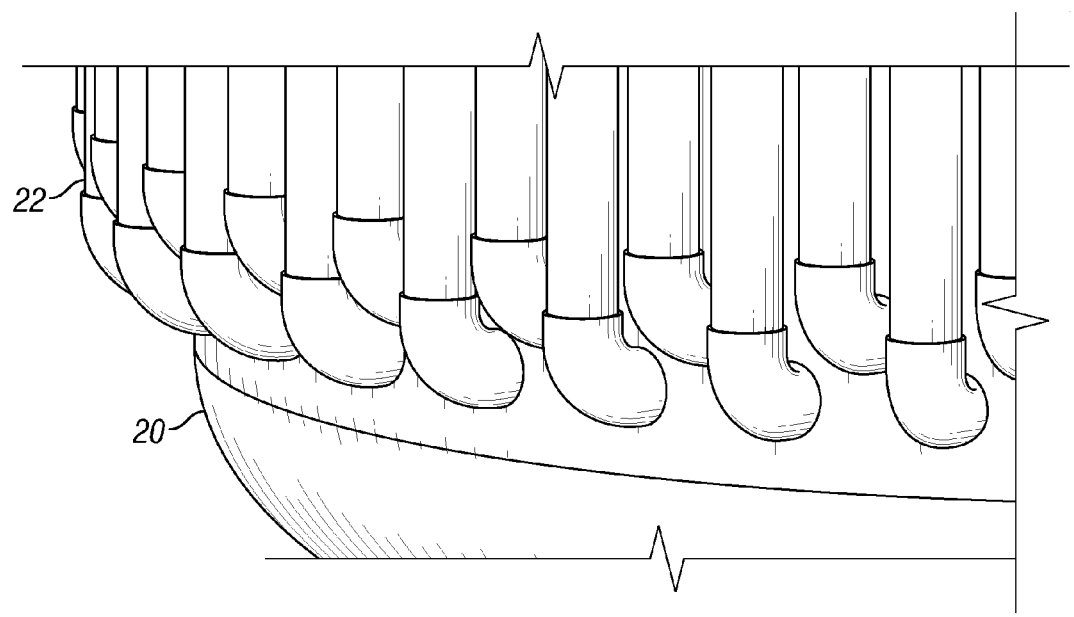
FIG. 5 is a schematic view of a portion of a receiver of FIGS. 2 and 3 showing the interface between the external tubes and the drum.

FIG. 3 shows a transparent side view of the receiver 14 according to an embodiment of the present invention using water as the heat transfer medium and depicting some of the internal components of the drum 20 as well as the annular piping for the feed stream entering the drum and the vapor leaving the drum. In particular, FIG. 3 shows a feed stream line 26 entering the bottom of the drum 20, a feed stream impingement baffle 28, and a feed stream storage area 30. The feed stream storage area 30 may be surrounded by a shroud 46. FIG. 3 also depicts a vapor line 32, a vapor baffle 34, a vapor discharge area 36, and a separator 38 dividing the feed stream storage area 30 from the vapor discharge area 36. FIG. 4 is similar to FIG. 3, but includes the external tubes 22 that carry the heat transfer medium. FIG. 5 shows the interface between the external tubes 22 and the drum 20 in greater detail.

During use, feed stream enters the receiver 14 through the feed stream line 26. Once inside the receiver 14, the feed stream is directed into the feed stream storage area 30 by the feed stream impingement baffle 28. One purpose of the feed stream impingement baffle 28 is to prevent incoming feed stream from impinging on internal components of the receiver 14. In one preferred embodiment, the ends 40 of the external tubes 22 (shown in FIGS. 4 and 5) are connected to the feed stream storage area 30 so that feed stream can be supplied to the tubes 22 as needed to maintain a sufficient amount of heat transfer medium in the tubes. As the receiver 14 receives solar radiation, the heat transfer medium within the tubes is heated until it at least partially vaporizes. The vapor mixture is then directed back into the drum 20 where the vapor accumulates in the vapor discharge area 36 and any unvaporized heat transfer medium rejoins the feed stream in the feed stream storage area 30. From the vapor discharge area, the vapor is channeled through the steam line 32 out of the receiver 14. Preferably, the vapor baffle 34 is positioned to prevent the outgoing vapor from carrying unwanted heat transfer medium out of the receiver 14 and directs the flow of the vapor from the appropriate locations within the receiver 14. Further preferably, the separator 38 divides the feed stream storage area 30 from the vapor discharge area 36. It is anticipated that the heat transfer medium could be water or any other suitable material.

In an alternative embodiment, the heat transfer fluid is fed into the external tubes 22. As the heat transfer medium is heated by solar radiation, it transfers heat through the outer walls of the drum 20 and into the heat transfer medium stored in the feed stream storage area 30. Thereafter, the heat transfer medium in the feed stream storage area 30 vaporizes and travels upward to the steam discharge area 36 where it is channeled into the steam line 32 and out of the receiver 14.

In one embodiment, after the vapor exits the receiver 14 it is preferably provided to a power generation device (not shown). For example, the vapor may be utilized to generate power by expansion in a turbine, turbogenerator, or similar device as would be known to one of ordinary skill in the art.

Figure 6:
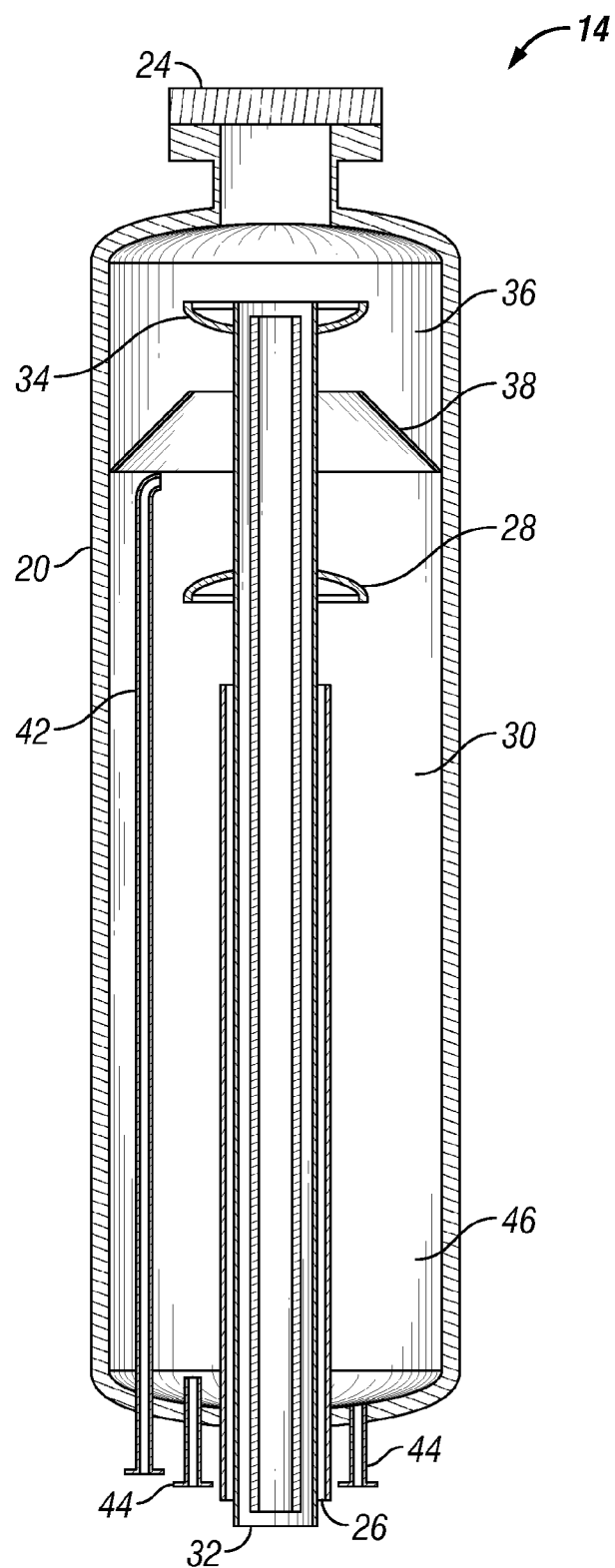
FIG. 6 is a side cross-sectional view of a receiver of FIGS. 2-4 taken along line 5-5 of FIG. 2.

There is shown in FIG. 6 a side cross-sectional view of the receiver 14 according to an embodiment of the present invention without showing the external tubes, including additional drain and instrument level connections. As in FIGS. 3 and 4 above, FIG. 6 shows the drum 20, a feed stream line 26, a feed stream impingement baffle 28, a feed stream storage area 30, a vapor line 32, a vapor baffle 34, a vapor discharge area 36, and a separator 38. In addition, FIG. 6 shows a level bridle 42 with one end in the feed stream storage area 30 of the drum and the other end outside the drum. The level bridle is positioned so that feed stream will communicate through the bridle to level measure instrumentation outside of the drum. Thus, the feed stream storage area will not usually be inadvertently overfilled or underfilled. In addition, FIG. 3 shows drains 44 in the bottom of the drum 20 that may be opened to drain fluid from the bottom of the drum as necessary. In a preferred embodiment, there is a manway 24 at the top of the drum 20 to provide access to the internal components of the receiver 14. Access to the internal components of the drum may be desired for a number of reasons, including, for example, servicing or replacing internal components of the drum.

Figure 7:
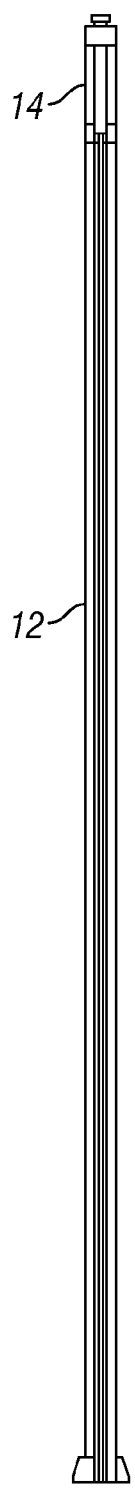
FIG. 7 is aside view of the tower having a receiver attached to the top.

FIG. 7 shows the tower 12 according to a preferred embodiment of the present invention. As can be seen, the tower 12 is preferably an annular pipe that is configured for attachment to the receiver 14 at the top thereof. Advantageously, the tower 12 may be prefabricated in sections at any convenient location and then transferred to a power plant site. In one preferred embodiment, the sections are 50 to 80 feet long. Once on site in the field, the sections of the tower 12 are assembled, such as, for example, by welding, on the ground and the receiver 14 is attached to the top thereof. Thereafter, the assembled tower 12 and receiver 14 may be lifted to a vertical position by a crane. Alternatively, the tower 12 may be lifted prior to installation of the receiver 14, in which case the receiver 14 could be attached after the tower 12 is in a vertical position.

An advantage of the present invention over the prior art is the fact that all of the components of the receiver may be self contained in one unit and the tower may be prefabricated in transportable sections. Such an arrangement allows the receiver and tower to be fabricated and assembled in the shop if desired. Then, only minor field erection may be required to assemble the tower, attach the receiver thereto, and connect the receiver to a power generating device such as a steam generator. This arrangement is often more cost and/or labor efficient than prior art systems that usually require complicated assembly and/or erection of many different components in the field.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention.

What is claimed is:

1. A solar energy system, comprising:
a tower having a solar radiation receiver, the solar radiation receiver including a plurality of tubes carrying a heat-transfer medium and a drum, the drum in thermal communication with the tubes;
wherein the drum has a feed stream portion and a steam portion, the feed stream portion in liquid communication with the tubes and arranged to provide the heat-transfer medium thereto, and the steam portion arranged to receive steam from the tubes after the heat-transfer medium has been transformed into steam;
a first tube concentric within a second tube, wherein a feed stream is introduced into said feed stream portion of the drum through an annulus between said first and second tubes, and steam is evacuated from the steam portion of said drum through an inner bore of said first tube; and
one or more mirrors configured to reflect solar radiation onto the receiver;
wherein the receiver receives the reflected solar radiation from the mirrors, thereby heating the heat transfer medium and vaporizing the heat transfer medium.

2. The solar energy system of claim 1, wherein the heat transfer medium is water, and the water changes to steam as the water is heated.

3. The solar energy system of claim 1, further comprising a fixed separator configured to divide the feed stream portion and the steam portion of the drum.

4. The solar energy system of claim 1, further comprising a level bridle having a first end inside the feed stream portion of the drum and a second end outside the drum, the level bridle configured to facilitate the measurement of the feed stream level inside of the drum.

5. The solar energy system of claim 1, further comprising at least one drain in the drum to drain water from the drum.

6. The solar energy system of claim 1, further comprising a manway arranged to provide access the inside of the drum.

7. The solar energy system of claim 1, wherein the receiver is substantially convex and the mirrors are arranged circumferentially around the tower to reflect solar radiation to the receiver from more than one direction.

8. The solar energy system of claim 1, wherein the heat transfer medium is selected from the group consisting of methanol, a single component hydrocarbon, and a single component refrigerant.

9. The solar energy system of claim 1, wherein the tower is an annular pipe configured for attachment to the receiver at the top thereof.

10. The solar energy system of claim 1, further comprising a feed stream impingement baffle disposed near an exit of said feed stream line for directing the feed stream into said feed stream storage portion.

11. The solar energy system of claim 1, further comprising a vapor baffle disposed near an entrance to said steam line for preventing outgoing vapor from carrying unwanted heat transfer medium out of the drum.

12. A method of generating power from sunlight using the system of claim 1, the method comprising:
focusing sunlight on a convex solar radiation receiver attached to a tower, the receiver being in thermal communication with a heat transfer medium such that focused sunlight heats and vaporizes the heat transfer medium; and
employing the vaporized heat transfer medium in a turbine generator to produce power.

13. The method of claim 12, further comprising the step of arranging a plurality of mirrors circumferentially around the receiver so that sunlight is focused onto the receiver from more than one direction.

14. The method of claim 13, wherein the receiver extends 360 degrees around the top of the tower and the mirrors are arranged in a circular configuration 360 degrees around the tower.

15. A solar energy system, comprising:
a tower having a solar radiation receiver attached thereto;
a plurality of mirrors arranged circumferentially around the tower and configured to focus sunlight onto the receiver;
wherein the receiver includes:
a drum and a plurality of tubes disposed on an external surface of the drum for carrying a heat transfer medium, wherein the plurality of tubes are configured to receive radiation from sunlight reflected from said mirrors, and heat and substantially vaporize said heat transfer medium;
a feed stream storage portion and a steam discharge portion within said drum, the feed stream storage portion in liquid communication with the plurality of tubes and arranged to provide water thereto, and the steam discharge portion arranged to receive steam from the tubes after the water has been transformed into steam;
a feed stream line connected to the feed stream storage portion and configured to introduce feed stream into the feed stream storage portion of the drum, and a steam line connected to the steam discharge portion and configured to evacuate steam from the steam discharge portion of the drum;
a conical separator between the feed stream storage portion and the steam discharge portion of the drum.

16. The solar energy system of claim 15, wherein the receiver extends 360 degrees around the top of the tower and has a longitudinal axis.

17. The solar energy system of claim 16, wherein the plurality of mirrors focus the sunlight onto the axis of the receiver.

18. The solar energy system of claim 15, wherein the heat transfer medium is water and the water transforms to steam within the tubes.

* * * * *